(12) United States Patent
Morimitsu et al.

(10) Patent No.: US 9,139,746 B2
(45) Date of Patent: *Sep. 22, 2015

(54) PHASE CHANGE INK COMPOSITIONS COMPRISING MIXTURES OF ESTER OF TARTARIC ACID AND ESTER OF CITRIC ACID AS AMORPHOUS MATERIALS

(71) Applicant: XEROX CORPORATION, Norwalk, CT (US)

(72) Inventors: Kentaro Morimitsu, Mississauga (CA); Adela Goredema, Mississauga (CA); Naveen Chopra, Oakville (CA); Daryl W. Vanbesien, Burlington (CA)

(73) Assignee: XEROX CORPORATION, Norwalk, CT (US)

(*) Notice: Subject to any disclaimer, the term of this patent is extended or adjusted under 35 U.S.C. 154(b) by 50 days.

This patent is subject to a terminal disclaimer.

(21) Appl. No.: 13/910,011

(22) Filed: Jun. 4, 2013

(65) Prior Publication Data

US 2014/0357772 A1    Dec. 4, 2014

(51) Int. Cl.
*C09D 11/102* (2014.01)
*C09D 11/38* (2014.01)

(52) U.S. Cl.
CPC ............... *C09D 11/102* (2013.01); *C09D 11/38* (2013.01)

(58) Field of Classification Search
CPC ........................................................ C09D 11/38
USPC ................ 106/31.58, 31.86, 31.29, 31.61
See application file for complete search history.

(56) References Cited

U.S. PATENT DOCUMENTS

| | | | |
|---|---|---|---|
| 3,041,192 A * | 6/1962 | Brouillard et al. | ............ 106/413 |
| 4,490,731 A | 12/1984 | Vaught | |
| 4,889,560 A | 12/1989 | Jaeger | |
| 4,889,761 A | 12/1989 | Titterington | |
| 5,195,430 A | 3/1993 | Rise | |
| 5,221,335 A | 6/1993 | Williams | |
| 5,231,135 A | 7/1993 | Machell | |
| 5,372,852 A | 12/1994 | Titterington | |
| 5,621,022 A | 4/1997 | Jaeger | |
| 6,221,137 B1 | 4/2001 | King | |
| 6,472,523 B1 | 10/2002 | Banning | |
| 6,476,219 B1 | 11/2002 | Duff | |
| 6,576,747 B1 | 6/2003 | Carlini | |
| 6,576,748 B1 | 6/2003 | Carlini | |
| 6,590,082 B1 | 7/2003 | Banning | |
| 6,646,111 B1 | 11/2003 | Carlini | |
| 6,663,703 B1 | 12/2003 | Wu | |
| 6,673,139 B1 | 1/2004 | Wu | |
| 6,696,552 B2 | 2/2004 | Mayo | |
| 6,713,614 B2 | 3/2004 | Carlini | |
| 6,726,755 B2 | 4/2004 | Titterington | |
| 6,755,902 B2 | 6/2004 | Banning | |
| 6,821,327 B2 | 11/2004 | Jaeger | |
| 6,958,406 B2 | 10/2005 | Banning | |
| 7,053,227 B2 | 5/2006 | Jaeger | |
| 7,186,762 B2 | 3/2007 | Wong | |
| 7,381,831 B1 | 6/2008 | Banning | |
| 7,427,323 B1 | 9/2008 | Birau | |
| 7,973,186 B1 | 7/2011 | Goredema | |
| 8,741,040 B2 * | 6/2014 | Morimitsu et al. | ........ 106/31.29 |
| 8,784,547 B2 * | 7/2014 | Vanbesien et al. | ......... 106/31.29 |
| 8,814,999 B2 * | 8/2014 | Morimitsu et al. | ........ 106/31.29 |
| 2012/0274716 A1 * | 11/2012 | McConville et al. | ......... 347/102 |
| 2012/0277462 A1 * | 11/2012 | Enright et al. | ................ 560/180 |

* cited by examiner

*Primary Examiner* — Tae H Yoon
(74) *Attorney, Agent, or Firm* — Pillsbury Winthrop Shaw Pittman LLP

(57) ABSTRACT

The disclosure provides phase change ink compositions comprising an amorphous material comprising mixtures of ester of tartaric acid and ester of citric acid.

7 Claims, 3 Drawing Sheets

PHASE CHANGE INK COMPOSITIONS COMPRISING MIXTURES OF ESTER OF TARTARIC ACID AND ESTER OF CITRIC ACID AS AMORPHOUS MATERIALS

CROSS-REFERENCE TO RELATED APPLICATIONS

Reference is made to commonly owned and co-pending, U.S. patent application Ser. No. 13/909,975 entitled "Mixtures Of Ester Of Tartaric Acid And Ester Of Citric Acid As Amorphous Materials For Phase Change Inks" to Kentaro Morimitsu et al., electronically filed on the same day herewith; the entire disclosure of which is incorporated herein by reference in its entirety.

INTRODUCTION

The present embodiments relate to phase change ink compositions comprising an amorphous material comprises an ester of tartaric acid and an ester of citric acid.

Solid inks include but are not limited to phase change ink compositions which are characterized by being solid at room temperature (e.g., 20-27° C.) and molten at an elevated temperature at which the molten ink is applied to a substrate. These phase change ink compositions can be used for ink jet printing.

Ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing phase change ink for printing on a recording medium such as paper. In piezo ink jet printing processes employing hot melt inks, the phase change ink is melted by the heater in the printing apparatus and utilized (jetted) as a liquid in a manner similar to that of conventional piezo ink jet printing. Upon contact with the printing recording medium, the molten ink solidifies rapidly, enabling the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

In general, phase change inks (sometimes referred to as "hot melt inks") are in the solid phase at ambient temperature, but exist in the liquid phase at the elevated operating temperature of an ink jet printing device. At the jetting temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

While the above conventional phase change ink technology is successful in producing vivid images and providing economy of jet use and substrate latitude on porous papers, such technology has not been satisfactory for coated substrates. Thus, while known compositions and processes are suitable for their intended purposes, a need remains for additional means for forming images or printing on coated paper substrates. As such, there is a need to find alternative compositions for phase change ink compositions and future printing technologies to provide customers with excellent image quality on all substrates, including selecting and identifying different classes of materials that are suitable for use as desirable ink components.

Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY

According to embodiments illustrated herein, there is provided phase change ink comprising a crystalline component; and an amorphous component material comprising a mixture of an ester of tartaric acid and an ester of citric acid; wherein the amorphous component material has a glass transition temperature of from about −20° C. to about 50° C.

In particular, the present embodiments provide a phase change ink comprising a crystalline component; and an amorphous component material comprising a mixture of an ester of tartaric acid and an ester of citric acid; wherein the ester of tartaric acid have a formula of

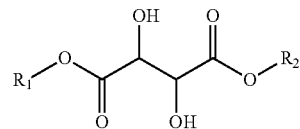

wherein each $R_1$ and $R_2$ is independently alkyl, aryl or heteroaryl group, and further wherein the tartaric acid backbone is selected from L-(+)-tartaric acid, D-(−)-tartaric acid, DL-tartaric acid, mesotartaric acid, and mixtures thereof; and wherein the ester of citric acid have a formula of

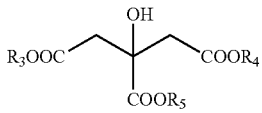

wherein each $R_3$, $R_4$ and $R_5$ is independently selected from the group consisting of

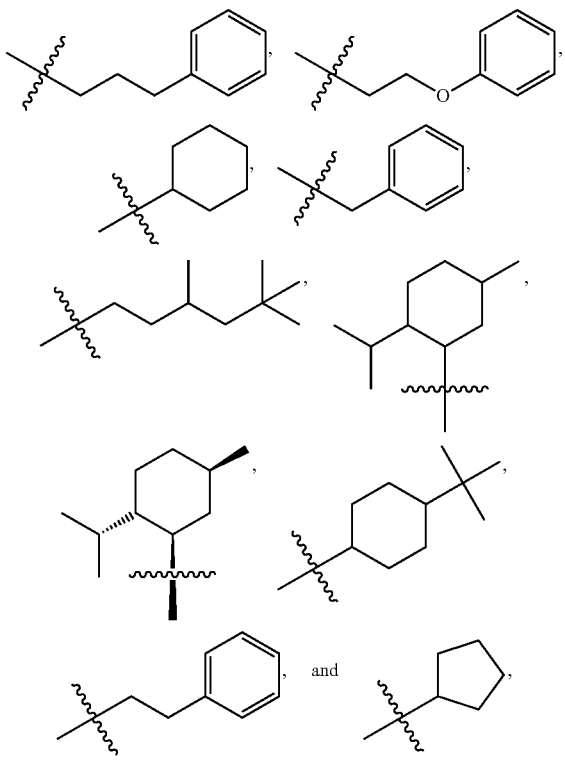

, and

, wherein the amorphous component material has a glass transition temperature of from about −20° C. to about 50° C.

In one embodiment, the present embodiments provide a phase change ink comprising a crystalline component; and an amorphous component material comprising a mixture of dicyclohexyl L-tartrate and tricyclohexyl citrate.

BRIEF DESCRIPTION OF THE DRAWINGS

For a better understanding of the present embodiments, reference may be made to the accompanying figures.

DETAILED DESCRIPTION

Figure 1:
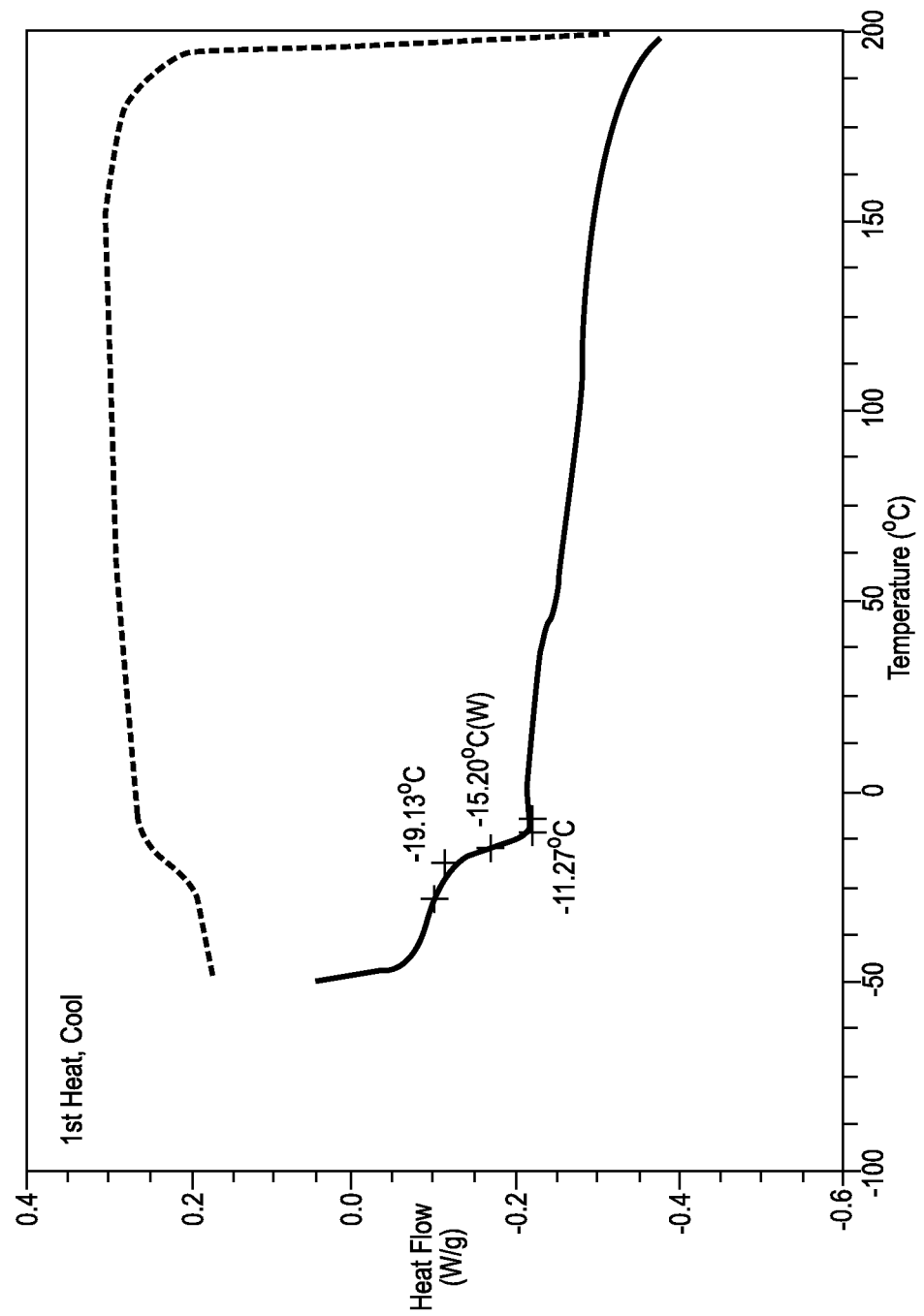
FIG. 1 is differential scanning calorimetry (DSC) data of an amorphous material confirming the amorphous properties according to the present embodiments (the DSC data was obtained on a Q1000 Differential Scanning calorimeter (TA Instruments) at a rate of 10° C./min from −50 to 200 to −50° C.).

In the following description, it is understood that other embodiments may be utilized and structural and operational changes may be made without departure from the scope of the present embodiments disclosed herein.

The present embodiments provide a material as an amorphous component of a phase change ink comprising a mixture of (1) an ester of tartaric acid and (2) an ester of citric acid, generally in a mol % ratio of from about 10:90 to about 90:10, respectively. In more specific embodiments, the mol % ratio of the ester of tartaric acid to the ester of citric acid is from about 15:85 to about 85:15, or is from about 20:80 to about 80:20, or is from about 25:75 to about 75:25.

Generally, the amorphous material of the present embodiments show typical amorphous characteristic. For example, the amorphous material may have a glass transition temperature (Tg) of from about −20° C. to about 50° C., from about −17° C. to about 40° C., or from about −15° C. to about 30° C.

The amorphous material may show relatively low viscosity (<200 centipoise (cps), or from about 1 to about 200 cps, or from about 5 to about 150 cps) near the jetting temperature (≤140° C., or from about 100 to about 140° C., or from about 105 to about 140° C.) but very high viscosity (>$10^5$ cps) at room temperature.

The ester of tartaric acid present in the amorphous material of the present embodiments may have the following formula:

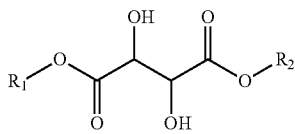

wherein each $R_1$ and $R_2$ is independently alkyl, aryl or heteroaryl group. The alkyl group can be straight, branched or cyclic, saturated or unsaturated, substituted or unsubstituted, having from about 1 to about 40 carbon atoms or from about 1 to about 20 carbon atoms. The alkyl group can be substituted with one or more aryl or heteroaryl group. The aryl or heteroaryl group of $R_1$ and $R_2$ can be substituted or unsubstituted. The aryl or heteroaryl group can have from about 4 to about 40 carbons, or from about 5 to about 20 carbons. The tartaric acid backbone can be selected from L-(+)-tartaric acid, D-(−)-tartaric acid, DL-tartaric acid, or mesotartaric acid, and mixtures thereof. In one embodiment, each $R_1$ and $R_2$ can be alkyl group. In a specific embodiment, each $R_1$ and $R_2$ can be cyclohexyl group.

In specific embodiments, the ester of tartaric acid can be dibenzyl L-tartrate, diphenethyl L-tartrate, bis(3-phenyl-1-propyl) L-tartrate, bis(2-phenoxyethyl) L-tartrate, diphenyl L-tartrate, bis(4-methylphenyl) L-tartrate, bis(4-methoxylphenyl) L-tartrate, bis(4-methylbenzyl) L-tartrate, bis(4-methoxylbenzyl) L-tartrate, dicyclohexyl L-tartrate, bis(4-tert-butylcyclohexyl) L-tartrate, and any stereoisomers and mixtures thereof. (Please confirm or revise example list)

The ester of tartaric acid can be synthesized via an esterification reaction of tartaric acid.

The ester of citric acid present in the amorphous material of the present embodiments may have the following formula:

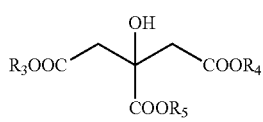

each $R_3$, $R_4$ and $R_5$ is independently alkyl, aryl or heteroaryl. The alkyl group can be straight, branched or cyclic, saturated or unsaturated, substituted or unsubstituted, having from about 1 to about 40, or from about 1 to about 20 carbon atoms. The alkyl group can be substituted with one or more aryl or heteroaryl group. The aryl or heteroaryl group of $R_3$, $R_4$ and $R_5$ can be substituted or unsubstituted. The aryl or heteroaryl group can have from about 4 to about 40 carbons, or from about 5 to about 20 carbons. In one embodiment, each $R_3$, $R_4$ and $R_5$ can be alkyl group. In a specific embodiment, each $R_3$, $R_4$ and $R_5$ can be cyclohexyl group. In certain embodiments, each $R_3$, $R_4$ and $R_5$ can be independently selected from the group consisting of

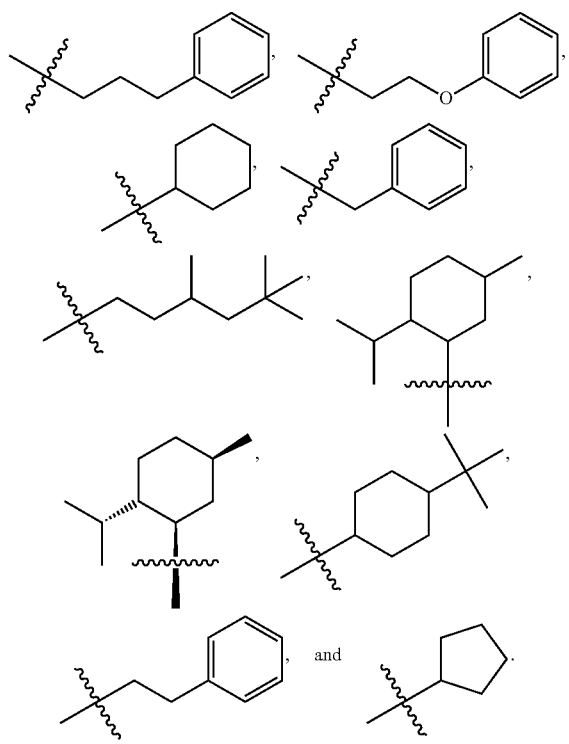

In specific embodiments, the ester of citric acid can be tris(3-phenylpropyl) citrate, tris(2-phenoxyethyl) citrate, tricyclohexyl citrate, tribenzyl citrate, tris(3,5,5-trimethylhexyl) citrate, tri-DL-menthyl citrate, tri-L-menthyl citrate, tris(4-tert-butylcyclohexyl) citrate, tris(2-phenylethyl) citrate, tricyclopentyl citrate, and any stereoisomers and mixtures thereof.

The mixture of esters of the tartaric acid and citric acid can be prepared by reacting a tartaric acid and a citric acid with an alcohol in a simple one-pot reaction shown in Scheme 1, which illustrates the preparation of an amorphous material of the certain embodiments of the present disclosure.

Scheme 1

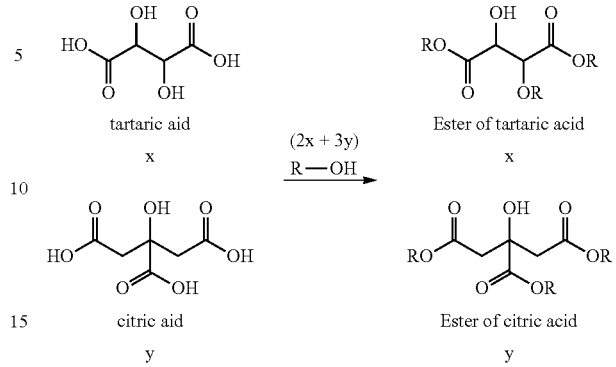

Suitable alcohols to be used with the present embodiments may be selected from the group consisting of alkyl alcohol, wherein the alkyl portion of the alcohol can be straight, branched or cyclic, saturated or unsaturated, substituted or unsubstituted, having from about 1 to about 40 carbon atoms, or a substituted or unsubstituted aromatic or heteroaromatic group, and mixtures thereof. In embodiments, the alcohols may include the followings

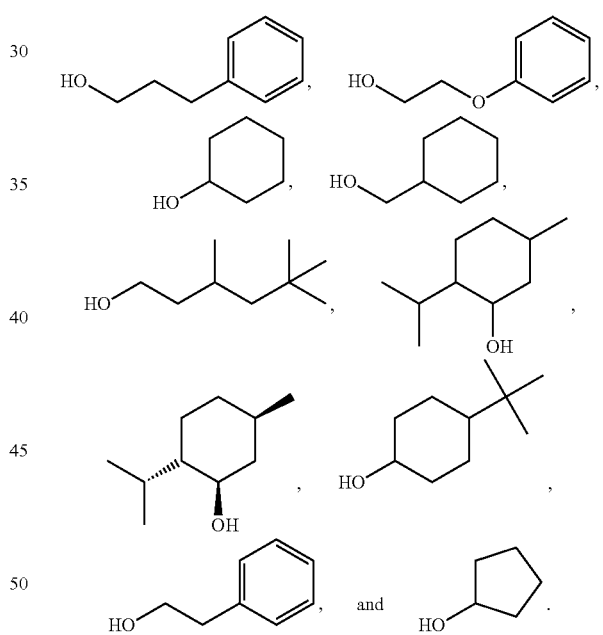

In embodiments, the amount of alcohol may be used in the reaction to produce a mixture of esters of tartaric acid and citric acid may equal to the sum of the molar equivalents or more (i.e., greater than or equal to 2x+3y) of the starting materials, namely, tartaric acid and citric acid.

In embodiments, the amorphous materials are formulated with a crystalline material to form a phase change ink composition. The ink compositions show good rheological profiles. Image samples created by the phase change ink composition on coated paper by K-proof exhibit excellent robustness.

A K-proofer is a common test fixture in a print shop. In this case the proofer has been modified to heat the printing plate to melt the phase change ink. The K-Proofer used has three rectangular gravure patterns each approximately 9.4×4.7 cm. The cell density of the first rectangle is nominally 100%, the second 80%, and the third 60%. In practice this K-proof plate results in films (or pixels) of about 5 microns in thickness (or height). Test ink is spread over the heated gravure plate and a test print is made by passing a wiping blade across the plate surface immediately follow by a rubber roll upon which a test paper has been secured. As the paper roll passes ink is transferred from the gravure cells to the paper.

In embodiments, the phase change ink composition is obtained by using the amorphous materials of the present disclosure synthesized from a mixture of tartaric acid and citric acid and an alcohol in an esterification reaction. The phase change ink composition comprises the amorphous material of the present embodiments in combination with a crystalline material and an optional colorant.

The phase change ink composition comprises a crystalline component, and an amorphous component comprises an ester of tartaric acid and an ester of citric acid of the present embodiments, generally in a weight ratio of from about 60:40 to about 95:5, respectively. In more specific embodiments, the weight ratio of the crystalline to amorphous component is from about 65:35 to about 95:5, or is from about 70:30 to about 90:10. In other embodiments, the crystalline and amorphous components are blended in a weight ratio of from about 1.5 to about 20 or from about 2.0 to about 10, respectively.

In embodiments, the crystalline material is present an amount of from about 60 percent to about 95 percent by weight, or from about 65 percent to about 95 percent by weight, or from about 70 percent to about 90 percent by weight of the total weight of the ink composition. In embodiments, the amorphous material is present an amount of from about 5 percent to about 40 percent by weight, or from about 5 percent to about 35 percent by weight, or from about 10 percent to about 30 percent by weight of the total weight of the ink composition The present embodiments comprise a balance of amorphous and crystalline materials to realize a sharp phase transition from liquid to solid and facilitate hard and robust printed images, while maintaining a desired level of viscosity. Prints made with this ink demonstrated advantages over commercially available inks, such as for example, better robustness against scratch. Thus, the present mixture of ester of tartaric acid and ester of citric acid, which provide amorphous components for the phase change inks, have been discovered to produce robust inks having desirable rheological profiles and that meet the many requirements for inkjet printing.

The ink of embodiments may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF), 2,2-bis (4-(2-(3,5-di-tert-butyl-4-hydroxyhydrocinnamoyloxy)) ethoxyphenyl)propane (TOPANOL-205, available from Vertellus), tris(4-tert-butyl-3-hydroxy-2,6-dimethyl benzyl)isocyanurate (Aldrich), 2,2'-ethylidene bis(4,6-di-tert-butylphenyl)fluoro phosphonite (ETHANOX-398, available from Albermarle Corporation), tetrakis(2,4-di-tert-butylphenyl)-4,4'-biphenyl diphosphonite (ALDRICH 46), pentaerythritol tetrastearate (TCI America), tributylammonium hypophosphite (Aldrich), 2,6-di-tert-butyl-4-methoxyphenol (Aldrich), 2,4-di-tert-butyl-6-(4-methoxybenzyl)phenol (Aldrich), 4-bromo-2,6-dimethylphenol (Aldrich), 4-bromo-3,5-didimethylphenol (Aldrich), 4-bromo-2-nitrophenol (Aldrich), 4-(diethyl aminomethyl)-2,5-dimethylphenol (Aldrich), 3-dimethylaminophenol (Aldrich), 2-amino-4-tert-amylphenol (Aldrich), 2,6-bis(hydroxymethyl)-p-cresol (Aldrich), 2,2'-methylenediphenol (Aldrich), 5-(diethylamino)-2-nitrosophenol (Aldrich), 2,6-dichloro-4-fluorophenol (Aldrich), 2,6-dibromo fluoro phenol (Aldrich), α-trifluoro-o-cresol (Aldrich), 2-bromo-4-fluorophenol (Aldrich), 4-fluorophenol (Aldrich), 4-chlorophenyl-2-chloro-1,1,2-trifluoroethyl sulfone (Aldrich), 3,4-difluoro phenylacetic acid (Adrich), 3-fluorophenylacetic acid (Aldrich), 3,5-difluoro phenylacetic acid (Aldrich), 2-fluorophenylacetic acid (Aldrich), 2,5-bis (trifluoromethyl) benzoic acid (Aldrich), ethyl-2-(4-(4-(trifluoromethyl)phenoxy)phenoxy)propionate (Aldrich), tetrakis (2,4-di-tert-butyl phenyl)-4,4'-biphenyl diphosphonite (Aldrich), 4-tert-amyl phenol (Aldrich), 3-(2H-benzotriazol-2-yl)-4-hydroxy phenethylalcohol (Aldrich), NAUGARD 76, NAUGARD 445, NAUGARD 512, and NAUGARD 524 (manufactured by Chemtura Corporation), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

In embodiments, the phase change ink compositions described herein may also include a colorant. Any desired or effective colorant can be employed in the phase change ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Lampronol Black BR (C.I. Solvent Black 35) (ICI); Morton Morplas Magenta 36 (C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Pigments are also suitable colorants for the phase change inks. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue GLO (BASF); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Nipex 150 (Evonik), Carbon Black 5250 and Carbon Black 5750 (Columbia Chemical), and the like, as well as mixtures thereof.

Pigment dispersions in the ink base may be stabilized by synergists and dispersants. Generally, suitable pigments may be organic materials or inorganic. Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Savinyl Black RLS (Clariant); Morfast Black 101 (Rohm and Haas); Orasol Blue GN (Pylam Products); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue E (Keystone Aniline Corporation); Neozapon Black X51 (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like.

The colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink.

In embodiments, in the molten state, the ink carriers for the phase change inks may have a viscosity of from about 1 to about 22 cps, or from about 4 to about 15 cps, or from about 6 to about 12 cps, at a the jetting temperature. The jetting temperature is typically comprised in a range from about 100° C. to about 140° C. In embodiments, the phase change ink has a viscosity of about $>10^6$ cps, at room temperature. In embodiments, the phase change ink has a melting temperature ($T_{melt}$) of from about 65 to about 140° C., or from about 70 to about 140° C., from about 80 to about 135° C. and a crystallization temperature ($T_{crys}$) of from about 40 to about 140° C., or from about 45 to about 130° C., from about 50 to about 120° C., as determined by DSC at a rate of 10° C./min.

In embodiments, the resulting phase change ink has a viscosity of from about 1 to about 22 cps, or from about 4 to about 15 cps, or from about 6 to about 12 cps, in a jetting range of from about from about 100 to about 140° C. In embodiments, the phase change ink has a viscosity of about $>10^6$ cps, at room temperature. In embodiments, the phase change ink has a $T_{melt}$ of from about 65 to about 150° C., or from about 70 to about 140° C., from about 80 to about 135° C. and a $T_{crys}$ of from about 40 to about 140° C., or from about 45 to about 130° C., from about 50 to about 120° C., as determined by DSC at a rate of 10° C./min.

The ink compositions can be prepared by any desired or suitable method. For example, each of the components of the ink carrier can be mixed together, followed by heating, the mixture to at least its melting point, for example from about 60° C. to about 150° C., 80° C. to about 145° C. and 85° C. to about 140° C. The colorant may be added before the ink ingredients have been heated or after the ink ingredients have been heated. When pigments are the selected colorants, the molten mixture may be subjected to grinding in an attritor or ball mill apparatus or other high energy mixing equipment to affect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. In a specific embodiment, during the formation process, the inks in their molten state are poured into molds and then allowed to cool and solidify to form ink sticks. Suitable ink preparation techniques are disclosed in U.S. Pat. No. 7,186,762, the disclosure of which is incorporated herein by reference in its entirety.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4200 papers, XEROX® Image Series papers, Courtland® 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Elite Gloss, Sappi Warren Papers LUSTROGLOSS®, specialty papers such as Xerox DURAPAPER®, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that varies of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. It will be apparent, however, that the present embodiments can be practiced with many types of compositions and can have many different uses in accordance with the disclosure above and as pointed out hereinafter.

Example 1

Synthesis of Amorphous Materials

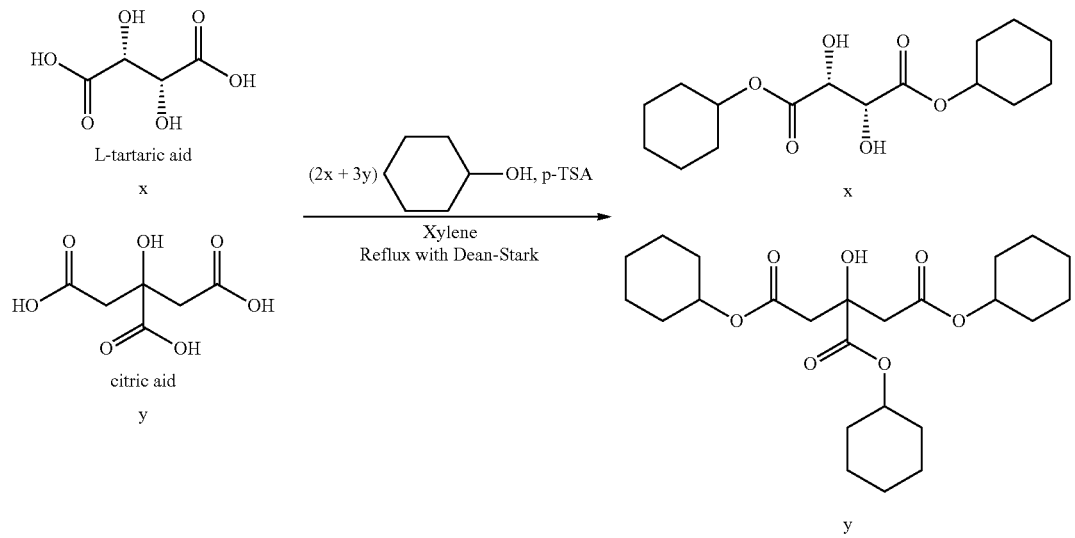

The amorphous materials according to certain embodiments of the present disclosure can be synthesized according to Scheme 2. Esterification reactions between an alcohol and a mixture of L-tartaric acid and citric acid were conducted via a simple one-pot reaction. Cyclohexanol was reacted in various ratios of the acids (i.e., L-tartaric acid and citric acid) to form the corresponding esters. The physical properties of the resulting esters are shown in Table 1.

TABLE 1

| Sample ID | L-tartaric acid ratio x (mol %) | Citric acid ratio y (mol %) | Acid number (mgKOH/g) | Tg (° C.) | Viscosity @ 140° C. (cps) |
|---|---|---|---|---|---|
| K-68 | 75 | 25 | 2.27 | −13 | ND* |
| K-71 | 60 | 40 | 4.06 | −14 | 13 |
| K-74 | 55 | 45 | 5.48 | −12 | 198 |
| K-65 | 50 | 50 | 11.76 | −11 | 3425 |
| K-66 | 25 | 75 | 13.41 | −15 | ND* |

*ND—not determined

Example 2

Synthesis of Sample K-71

In a 500 mL flask, equipped with a Dean-Stark trap, L-tartaric acid (12.0 g, 80 mmol), citric acid (10.24 g, 53.3 mmol), cyclohexanol (32.0 g, 320 mmol), and xylene (200 ml) were added to give a suspension. p-Toluenesulfonic acid monohydrate (0.61 g, 3.2 mmol) was added and the mixture was refluxed for 3 hours with azeotropic removal of water. The reaction mixture was cooled down to room temperature and washed with $NaHCO_3$ aq. (1×) and brine (1×), then dried over $MgSO_4$. After filtration and removal of the solvent, the residue was dried under vacuum with stirring at 100° C. to obtain 34.0 g (yield: 70.2%) of amorphous solid. $^1$H NMR indicated that the desired product was formed.

Samples K-68, K-74, K-65 and K-66 were prepared according to the same procedure described as in synthesis of sample K-71, except for changing the amounts of L-tartaric acid and citric acid according to the mol % ratio indicated in Table 1.

Example 3

Material Properties

FIG. 1 shows differential scanning calorimetry (DSC) data of sample K-71. The DSC data shows the glass transition temperature (Tg) of sample K-71 to be −14° C., and no crystallization peak is recorded, which indicates that the material is an amorphous solid. As shown in Table 1, the other samples also showed glass transitions, which is a characteristic of amorphous solids.

Figure 2:
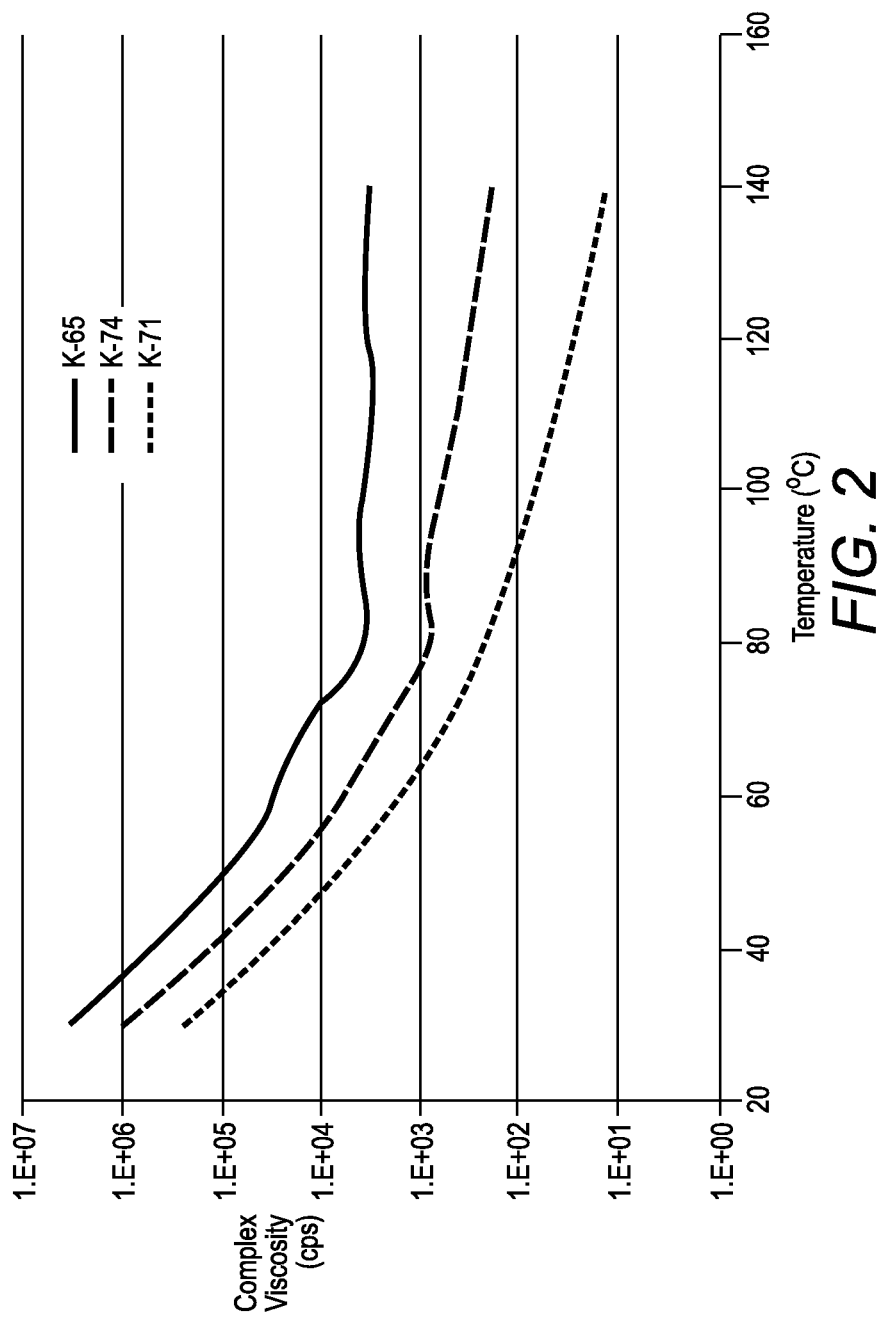
FIG. 2 is a graph illustrating rheology data of amorphous materials according to the present embodiments.

The rheology of sample K-71 was measured, and shown in FIG. 2, using an RFS3 controlled strain Rheometer (TA instruments) equipped with a Peltier heating plate and using a 25 mm parallel plate. The method used was a temperature sweep from high to low temperatures, in temperature steps of 5° C., a soak (equilibration) time of 120 seconds between each temperature and at a constant frequency of 1 Hz.

The rheology curve of sample K-71 has relatively low viscosity (<200 cps) at high temperatures (>100° C.), but very high viscosity (>$10^5$ cps) at room temperature. Samples K-65 and K-74 had higher viscosities than sample K-71, due to the fact that the amorphous component is about 20% of the ink formulation, such range of viscosity could provide jettable inks with appropriate ink formulation.

Example 4

Ink Characterization

Ink samples were formulated from the amorphous materials (Samples K-71, K-74, and K-65), a crystalline material namely Distearyl terephthalate (DST) having a structure shown below, and a pigment concentrate.

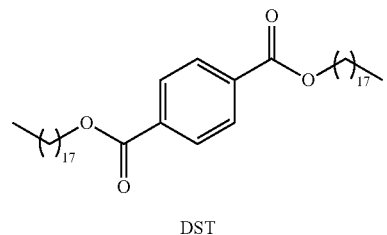

DST

The formulations are shown in Table 2 and the ink samples were labeled as Ink A, Ink B, and Ink C, respectively. The pigment concentrates contained DST crystalline, cyan pigment B4G, Polyethyleneimine (PEI) dispersant described in U.S. Pat. No. 7,973,186, and SunFlo SFD-B124 synergist. The pigment contents of the pigment concentrate was 20%. Such ratio provided each resulting ink 2% pigment loading.

TABLE 2

| | Ink A | | Ink B | | Ink C | |
|---|---|---|---|---|---|---|
| Component | Relative Parts (wt %) | Weight (g) | Relative Parts (wt %) | Weight (g) | Relative Parts (wt %) | Weight (g) |
| DST (crystalline) | 70 | 7 | 70 | 7 | 70 | 7 |
| K-71 | 20 | 2 | | | | |
| K-74 | | | 20 | 2 | | |
| K-65 | | | | | 20 | 2 |
| Cyan pigment concentrate (B4G) | 10 | 1 | 10 | 1 | 10 | 1 |
| Total | 100 | 10 | 100 | 10 | 100 | 10 |

Example 5

Figure 3:
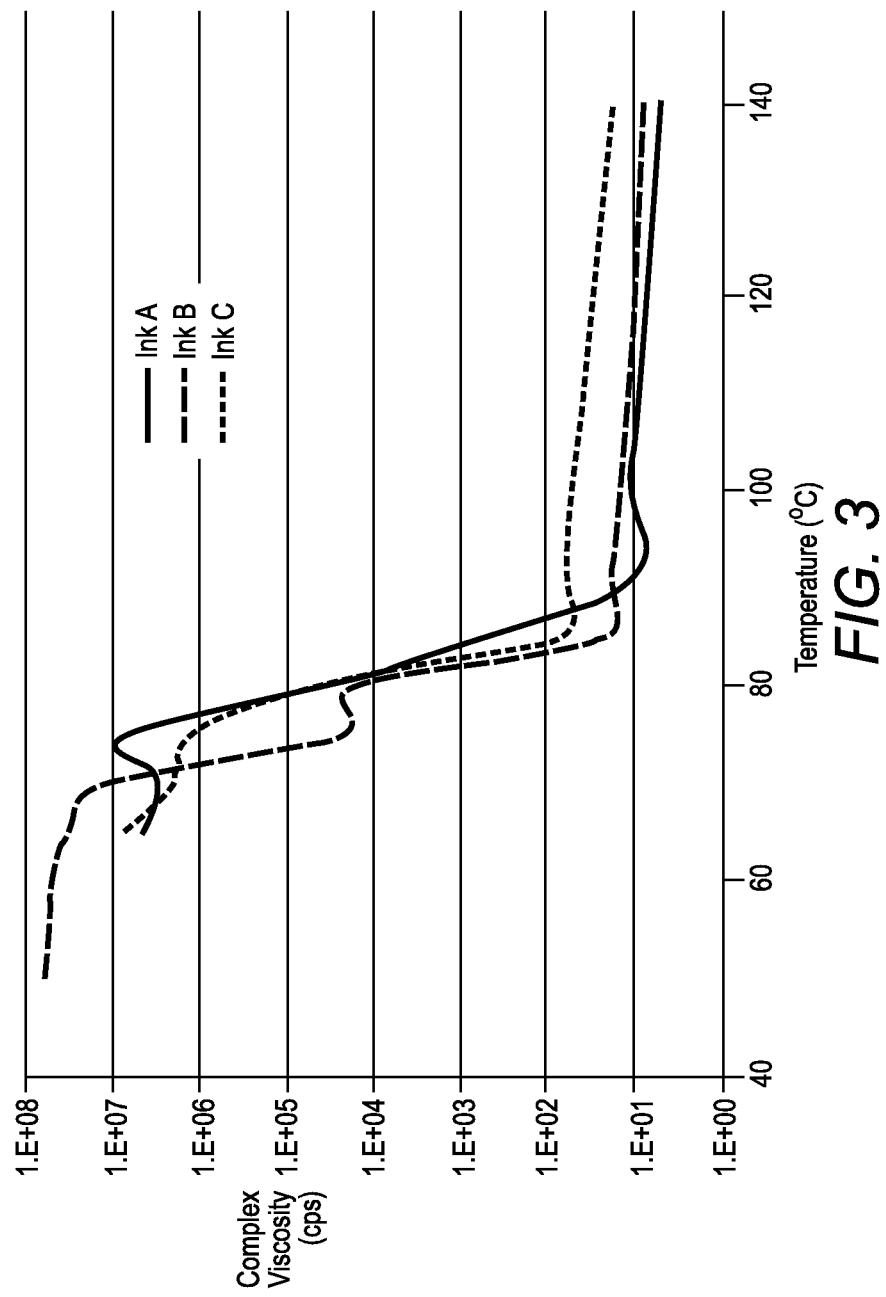
FIG. 3 is a graph illustrating rheology data of ink samples comprising amorphous materials made according to the present embodiments.

FIG. 3 shows rheology data of Ink A, Ink B, and Ink C. The inks showed sharp phase transition to >$10^6$ cps at around 85-90° C. The viscosities of Ink A and Ink B at 140° C. were about 5.75 cps and 7.42 cps, respectively, which are below the acceptable jetting viscosity (10 cps). Expected jetting temperatures based on rheology were 105° C. and 120° C., respectively. Ink C showed higher viscosity (17.20 cps) at the same temperature; reduction in viscosity can be achieved by using a viscosity modifier or reducing the amount of amorphous material.

Example 6

Robustness Performance

Inks A, B, and C were printed onto Xerox® Digital Color Elite Gloss, 120 gsm (DCEG) coated papers using the K-proofer gravure printing plate, which is rigged with a pressure roll set at low pressure. The gravure plate temperature was set at 142° C., but the actual plate temperature is about 134° C. The K-proofer apparatus (manufactured by RK Print Coat Instrument Ltd., Litlington, Royston, Heris, SG8 0OZ, U.K.) is a useful printing tool to screen a variety of inks at small scale and to assess image quality on various substrates. The inks gave robust images that could not be easily removed from the substrates. When a metal tip with a curved tip at an angle of about 15° from vertical, with a weight of 528 g applied, was drawn across the image at a rate of approximately 13 mm/s no ink was visibly removed from the image. The tip is similar to a lathe round nose cutting bit with radius of curvature of approximately 12 mm.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A phase change ink comprising:
   a crystalline component; and
   an amorphous component material comprising a mixture of dicyclohexyl L-tartrate and tricyclohexyl citrate;
   wherein the mol % ratio of the ester tartaric acid to the ester citric acid is from about 50:50 to about 75:25; wherein the amorphous component material has a glass transition temperature of from about −11° C. to about −14° C.

2. The phase change ink of claim 1, wherein the amorphous component material is present in an amount of from about 5 percent to about 40 percent by weight of the total weight of the phase change ink.

3. The phase change ink of claim 1, wherein the crystalline/amorphous ratio is from about 60/40 to about 95/5.

4. The phase change ink of claim 1 further comprising a colorant selected from the group consisting of a pigment, dye and mixtures thereof.

5. The phase change ink of claim 1 having a viscosity of less than 22 cps at a temperature of about 140° C.

6. The phase change ink of claim 1 having a viscosity of greater than $10^6$ cps at room temperature.

7. The phase change ink of claim 1 having a jetting temperature of from about 100 to about 140° C.

* * * * *